Oct. 3, 1961  R. NOACK ET AL  3,002,441
DIAPHRAGM FOR PHOTOGRAPHIC APPARATUS
Filed Nov. 29, 1955  2 Sheets-Sheet 2

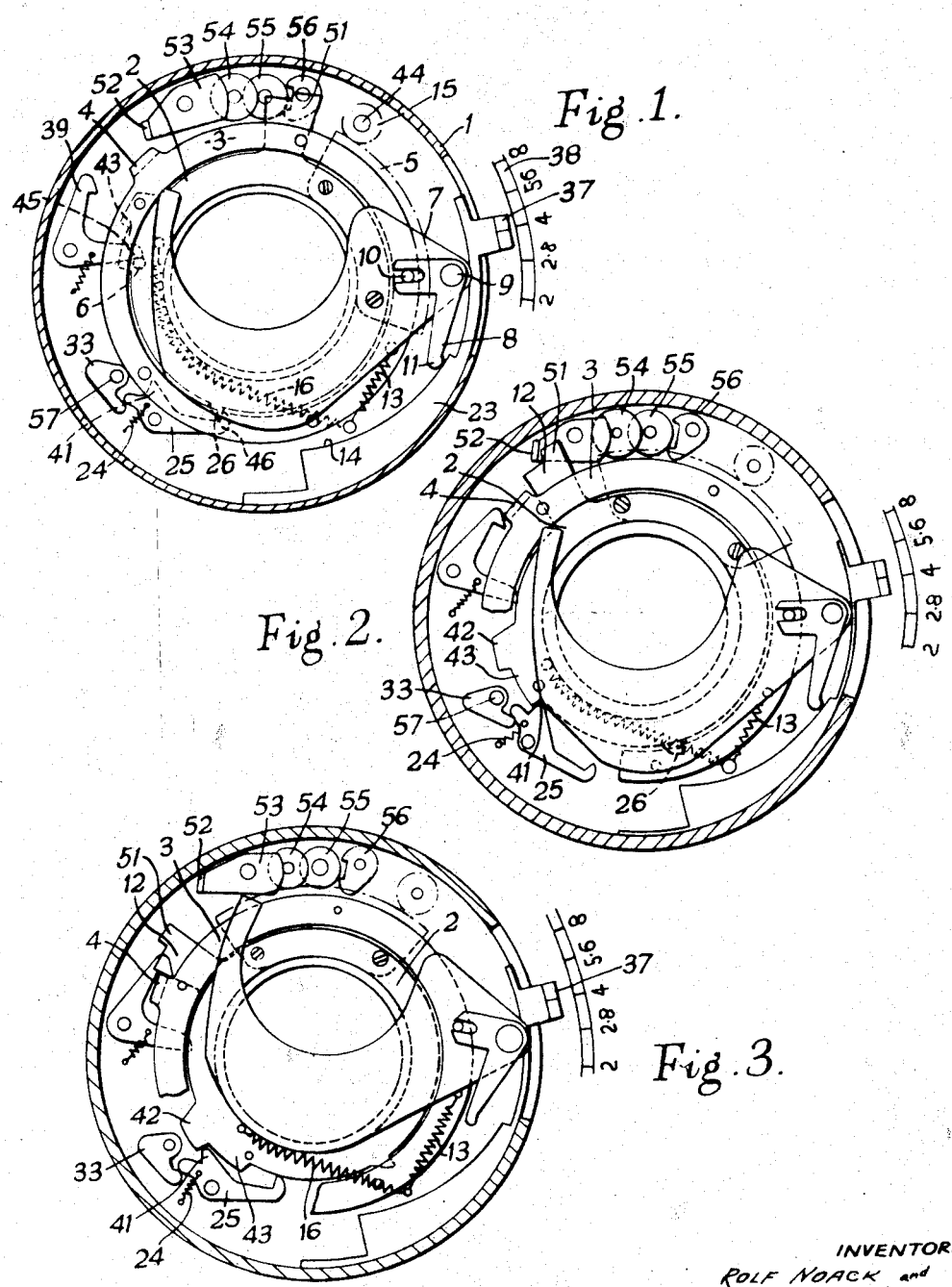

INVENTORS
ROLF NOACK and
JOHANNES WEISE
BY Young Emery
& Thompson
ATTORNEYS

United States Patent Office 3,002,441
Patented Oct. 3, 1961

3,002,441
DIAPHRAGM FOR PHOTOGRAPHIC APPARATUS
Rolf Noack and Johannes Weise, Dresden, Germany, assignors to VEB Kamera- und Kinowerke Dresden, a corporation of Germany
Filed Nov. 29, 1955, Ser. No. 549,823
7 Claims. (Cl. 95—64)

The present invention relates to a diaphragm arrangement for photographic cameras, wherein rotatably mounted diaphragm blades are moved by a spring-loaded diaphragm drive ring held in the cocked position by diaphragm locking members, so that on release of the diaphragm drive ring the diaphragm blades can set themselves automatically to a pre-selected value. It is here immaterial whether the diaphragm blades are situated in a position in which they completely clear or completely cover the shutter aperture prior to shutter cocking. Known diaphragm arrangements of this kind are so constructed that a setting member has a stop which projects into the path of the diaphragm ring running down under spring action. In order that the setting ring may not be displaced by the diaphragm ring during the running down movement, it is necessary to arrest the setting ring in all possible positions by means of catch elements. The catch elements provided lead to the disadvantage that intermediate value settings are not possible on the one hand, while on the other hand the operation of such a diaphragm is rendered difficult since an arresting means must first be released before a diaphragm value is selected.

Diaphragm arrangements are also known in which the diaphragm blades are incorporated in photographic lens shutters and serve as auxiliary or covering blades. These forms of construction have the disadvantage that they have an excessive number of structural parts, thus rendering the diaphragm mechanisms complicated. These structural parts are provided either in the form of constramoving spring-loaded driving members inside the shutter housing, or as operating mechanisms provided outside the shutters on the cameras.

The object of the invention is to provide an improved diaphragm arrangement which obviates the abovementioned disadvantages, is simple in construction, and thus dependable in operation. This is achieved by coupling a spring-loaded diaphragm driving ring to a rockably mounted intermediate member which, after releasing the running down movement of the diaphragm driving ring, strikes against a cam of the diaphragm setting means and limits the running down path of the diaphragm driving ring. The intermediate member has a stop, the direction of movement of which on striking the cam, forms an angle to the direction of the setting movement of the diaphragm setting means so that undesired movement of the setting means is prevented as a result of the force exerted by the member on the cam. This angle is preferably 90°. The intermediate member is mounted on a pivot pin common to a diaphragm blade so as to be movable therewith and to the same extent and may be positively coupled to the diaphragm driving ring. In this way no separate pivot pin is needed for the said member. The advantage consists in that the form of the cam of the setting means can be so selected that the diaphragm aperture becomes any desired mathematical function of the displacement along the path of the diaphragm setting means. In a further feature of the invention, the stop may be mounted on a diaphragm blade.

In order to enable the diaphragm arrangement to be used as a spring diaphragm for single-lens reflex cameras, and at the same time also as an auxiliary shutter, driver pins provided on the diaphragm driving ring and which engage in slots in the diaphragm blades are so disposed in the shutter that the axis of rotation of each diaphragm blade lies on a straight line which is determined by the centre of the shutter and the position assumed by the corresponding driver pin after covering half of its maximum stroke. This step enables the diaphragm blades to be brought into their two extreme positions, that is to say the open and closed positions, by simply removing the blades from their mounted positions and inserting them laterally reversed. This reversing enables the diaphragm blades automatically to adjust themselves to a preselected value either from the position in which they completely cover the shutter opening or from the position in which they completely expose the shutter opening.

In the installation of the new diaphragm arrangement into a shutter provided with the usual spring-loaded cocking ring, the cocking ring on being cocked actuates the locking members which hold the diaphragm driving ring in its cocked position and abuts, on the return to the rest position after release, with an arm against a lug provided on the diaphragm drive ring, so that the said diaphragm drive ring is driven in the direction of rotation of the cocking ring and the spring attached to the diaphragm drive ring is tensioned. This arrangement offers the advantage that, in order to obviate deformation phenomena, the energy inherent in the tensioning member does not have to be absorbed by additionally provided braking springs of known kind and thus lost, but this energy is supplied to the driving spring of the diaphragm driving ring. Additional braking elements are thus dispensed with, and the energy of the diaphragm driving ring can be utilised for a further shutter function.

Furthermore, an escapement may be provided, which retards the actuation of the shutter in relation to the closing of a contacting action, that is to say, to the closing of an electric flash-light current circuit.

Elements are also provided which prevent the diaphragm blades in front of the shutter blades from covering the shutter opening and thus determining the end of the exposure time. This step, which is necessary particularly at short exposure times, is achieved by so constructing a shutter member moved during the exposure process that it interrupts the movement of the tensioning member, returning into the position of rest, before the diaphragm closes. In order to prevent premature closing of the diaphragm in shutters which comprise an escapement for the regulation of exposure times and in which part of the shutter release mechanism returns to its position of rest even before the commencement of the exposure, the tensioning member is delayed by an additional retarding mechanism shortly before the closing of the diaphragm. The details of the invention are clear from the following description of exemplified embodiments, in which the diaphragm arrangement is incorporated in a lens shutter and the diaphragm blades serve as covering blades. Parts not essential to the invention have not been illustrated.

FIGURE 1 shows a form of construction of a shutter in the tensioned position;

FIGURE 2 shows the shutter in the position in which the running down movement of the cocking ring is interrupted;

FIGURE 3 shows the same shutter in the position of rest, the diaphragm being completely closed;

Figure 4:
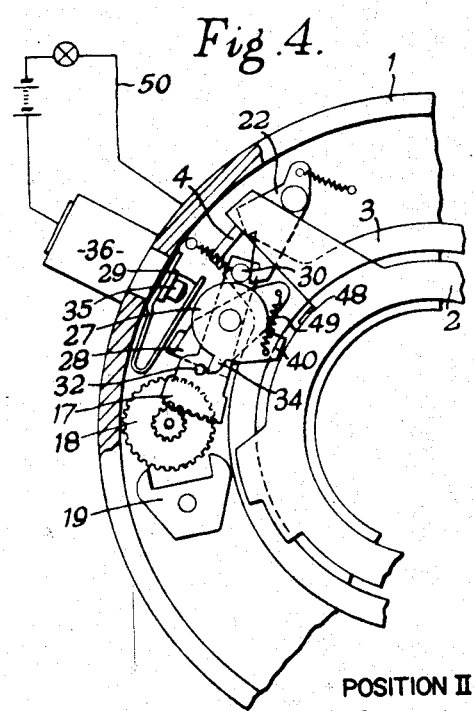
FIGURE 4 shows a shutter with a built-in escapement for retarding the actuation of the shutter in relation to a contacting action in the tensioned position after the exposure has been made.

In a housing denoted by reference 1 are mounted a cocking ring 2 and a diaphragm driving ring 3. The cocking ring 2 has, as operating means, a toothed segment 5, which is in mesh with a pinion 15. The arbor 44 of the pinion 15 serving for the tensioning is passed axially out of the shutter housing. Moreover, cocking ring 2 has a pin 6, by which it co-operates with a locking pawl 39. The locking pawl 39 lies with its arm 45 in a path of the projection 4, which is provided on the diaphragm driving ring 3, and arrests the diaphragm driving ring in the tensioned position against the action of a spring 13. The cocking ring 2 also has steps 43 and 42. The diaphragm driving ring 3 is provided with driver pins 10, which serve as bearing points for diaphragm blades 7, which are mounted so as to be rotatable about pins 9. A rotatably mounted cranked lever 8, which is coupled to the diaphragm driving ring 3, limits a opening stroke of the latter, striking the cam 14, provided on a diaphragm setting means 23, by a nose 11. A manipulator 37 is used to move the setting means 23. A scale 38 shows the diaphragm value setting. Moreover, a further driving ring (not illustrated) is also mounted in the shutter housing and carries, in known manner, shutter blades which are also not illustrated. By turning the pinion 15 in the anti-clockwise direction the spring 16 attached to the control ring 2 is tensioned.

Towards the end of the tensioning process, the pin 6 meets the arm 45 and takes the locking pawl 39 out of engagement with the projection 4 of the diaphragm driving ring 3. The diaphragm driving ring 3 then runs down in the clockwise direction under the action of the spring 13 and causes the diaphragm blades 7 to expose the shutter opening. The lever 8 coupled to the diaphragm driving ring 3 and mounted together with the diaphragm blade 7 is rocked in the anti-clockwise direction on this opening movement. The cam 14 on the diaphragm setting means 23 limits the opening stroke of the lever 8, however, since said cam lies in the path of the nose 11. At the end of the tensioning process a catch lever 25 of the shutter release mechanism falls behind a projection 26 of the control ring 2 owing to the force of the spring 24 which rocks a pawl 46, which pawl arrests said cocking ring in the tensioned position. Operation of a release lever 33 releases the cocking ring 2 so that it can run down and initiates the opening movement of the shutter blades, which are not illustrated. At the same time, the nose 41 is brought into the path of the step 43. The diaphragm driving ring 3 remains under the action of the spring 13 in the previously selected position. During the running down movement the cocking ring 2 causes the shutter blades to expose and again cover the shutter opening. Since the cocking ring 2 runs down very rapidly at short exposure times, the catch lever 25 is still in the release position (FIGURE 2) when the cocking ring 2 returns into the position of rest. The nose 41 engages the step 43 and stops the running down cocking ring 2 before the element 12 on the cocking ring strikes against the projection 4. In this way it is ensured that the closing of the shutter opening by the shutter blades is brought about before the diaphragm blades are moved into the closed position which occurs on further moving down of the cocking ring. When the operator has removed his finger from a release button or lever (not shown) connected to the shaft 57, the catch lever 25 and the release lever 33 return under the action of the spring 24 into the position of rest (FIGURE 3), whereby the nose 41 eases the cocking ring back a small distance against the force of the spring 16 and rocks out of the path of the step 43 and the cocking ring 2 is released to continue the running down movement. During the last part of the running down of the cocking ring 2 the element 12 drives the diaphragm driving ring 3, by means of the projection 4, against the action of the spring 13 and effects the closing of the diaphragm. By this arrangement the residual energy inherent in the cocking ring 2 is converted into effective work, the driving spring 13 of the diaphragm arrangement being tensioned. At the same time, the desired braking of the cocking ring 2 returning into its position of rest is thus obtained.

To obtain this effect, however, it is necessary for the driving spring 16 of the cocking ring 2 to be stronger than the spring 13 of the diaphragm driving ring 3. In the end position, the cocking ring 2 is arrested by reason of the nose 41 engaging the step 42. In this position operation of the release lever 33 is impossible, since the lever 25 is locked by the periphery of the step 43 lying in the path.

FIGURE 4 shows a form of construction in which the release of the opening movement of the diaphragm driving ring 3 is effected by a contact escapement mechanism running down before the actual exposure process. A braking means 27, which co-operates with the toothed segment 17 and which is constructed as a unilaterally operating driver, projects with a projection 40 into the path of a lug 48 provided on the cocking ring 2. When the cocking ring 2 runs down from the tensioned position, the cam 48 strikes the braking means 27, which drives the toothed segment 17 by the nose 43 through the pin 32. A spring-loaded contact lever 28 is connected to the braking means 27 by a tension spring 49, so that when the braking means 27 is rotated in the clockwise direction the lever 28 is also moved. A contact spring 29 is thus pressed against the central part 35 of a contact connection nipple 36 and the flashlight circuit 50 is closed. Moreover, the toothed segment 17 also has a pin 30, which co-operates with a locking member 22. The locking member 22 arrests the diaphragm driving ring 3 by the projection 4 and is taken out of engagement with the said projection 4 by the pin 30. After the spring-loaded diaphragm driving ring 3 has been released, it runs down until the cam 14 interrupts this movement (FIGURES 1 and 2). Closing of the diaphragm then again takes place after the exposure process as described previously has taken place when tensioned by the cocking ring 2.

Figure 5:
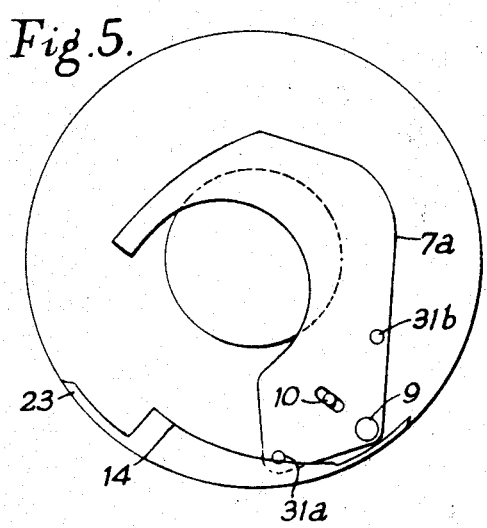
FIGURE 5 shows a special form of a diaphragm blade.

The diaphragm blade 7a shown in FIGURE 5 takes over the function of the lever 8 shown in FIGURES 1, 2 and 3. For this purpose it carries pins 31a and 31b which are disposed symmetrically. When the diaphragm blades 7 are turned in the direction of operation of the spring 13, the pin 31a in this case strikes the cam 14 of the diaphragm setting means 23 and thus limits the path of the diaphragm blades 7 and of the diaphragm driving ring 3.

The pin 31b as shown in FIGURE 5 becomes effective when the diaphragm blades have been laterally reversed as previously described and brought from the position II into the position I (FIGURE 6), so that the diaphragm blades can set themselves to the previously selected diaphragm value from a position in which they have completely covered the shutter aperture. The pin 31b serves in a similar manner to 31a for the limitation of the stroke of the diaphragm blades. The pin 10, which is mounted on the diaphragm drive ring 3, urges the diaphragm blade 7a towards a position to close the shutter aperture by rotation in the counter-clockwise direction about the point 9. Thus the diaphragm blade 7a is spring-loaded in the counter-clockwise direction.

If now the blade 7a were laterally reversed then the pin 31b would come into the position where the pin 31a was hitherto situated and the diaphragm blade 7a would be urged towards a position to fully open the shutter aperture.

Figure 6:
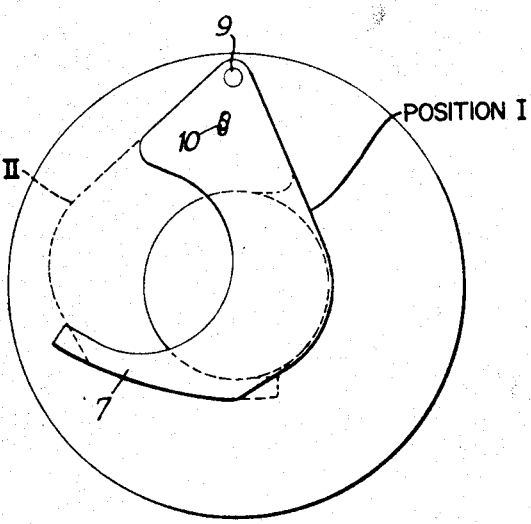
FIGURE 6 shows positions of the diaphragm blades, which are obtained by simple turning.

FIGURE 6 shows the two extreme positions of the diaphragm blades (one blade shown only). By laterally reversing the diaphragm blades the position I (closed) on the one hand, and the position II (open) on the other hand, are obtained on keeping the shutter driving ring 3 and hence the pins 10 in one position during the reversing process. These two positions I and II correspond to the starting positions for covering blades and spring diaphragm blades, that is to say the closed and open positions. In this way it is possible to simply reverse the diaphragm blades in the example and so provide a shutter suitable for reflex cameras with a diaphragm which is completely open outside the duration of the exposure.

Figure 7:
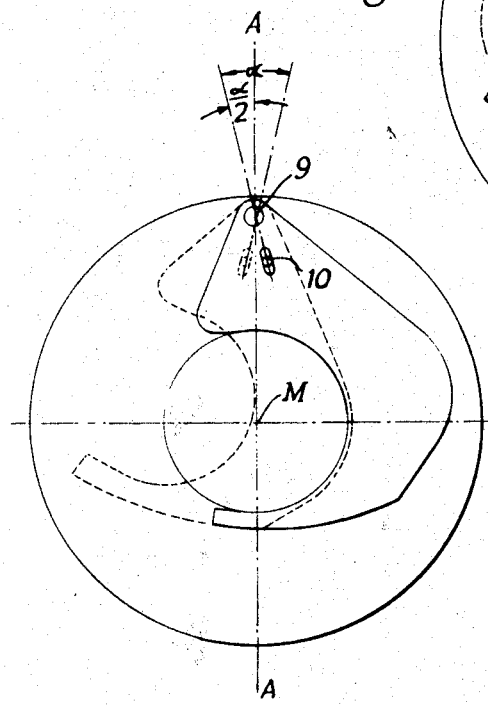
FIGURE 7 shows the stroke of the diaphragm blades.

The possibility of obtaining the said two extreme positions of the diaphragm blades presupposes that certain stroke conditions will be adhered to. FIGURE 7 shows how these required stroke conditions are obtained for diaphragm blades by the known symmetrical forming of the stroke of the shutter sectors in relation to the opening centre M. There, the maximum stroke α, by which is meant the angular path which must be covered by each diaphragm blade to pass from the position I to the position II, so divided that each driver pin 10 can swing out through an angle on both sides through the centre line A—A. The centre line A—A is determined by the bearing point 9 and the centre of the shutter M.

If the diaphragm arrangement is to be incorporated in a shutter having an escapement for the regulation of exposure times, a delayed action mechanism, an additional retarding arrangement must be provided to prevent the premature opening or closing of the diaphragm. For this purpose, the element 12 is provided with a projection 51 (FIGURES 1 to 3), which co-operates with the toothed segment 53 of the braking mechanism 52—56, which regulates the duration of the exposure. Various exposure times can be obtained by bringing the toothed segment 53 into the path of the element 12 in known manner and delaying the cocking ring 2 as soon as the shutter blades (not illustrated) have exposed the shutter opening during the running down of the cocking ring. Shortly before the running down cocking ring 2 strikes the projection 4 of the diaphragm driving ring 3 with the element 12, to close the diaphragm, the projection 51 strikes against a lug 52 of the toothed segment 53. The cocking ring 2 is thus delayed and prevented from closing the diaphragm before the shutter blade mechanism (not illustrated) has closed the shutter opening by means of the shutter blades.

In order to make the geared connection of the shutter to the camera as simple as possible, the operating shafts 44 and 57 are passed axially out of the shutter housing.

We claim:

1. For a camera having a shutter housing and a shutter arrangement provided with a shutter cocking member which can be moved from a resting position into a cocked position against the action of a biasing means prior to running towards the position of rest by the action of the biasing means for the purpose of exposure, the provision of a diaphragm arrangement comprising in combination a plurality of diaphragm blades rotatably mounted within the housing, a diaphragm driving ring also mounted within the housing in driving connection with said blades, a spring for biasing the driving ring for movement, a locking member pivotally mounted on the housing for locking said driving ring in a tensioned position against the action of said spring, means operatively associated with said cocking member to unlock said locking member, a diaphragm setting means, a cam provided on said setting means, a stop member connected with said driving ring so as to be moved by the latter into engagement with said cam for limiting the movement of said driving ring, whereby after actuation of said locking member the driving ring runs down and drives the diaphragm blades and said stop member, said stop member engaging the cam and limiting the movement of said driving ring in order to obtain a preselected aperture value, a first arm provided on said cocking member, a second arm provided on said driving ring lying in the running down path of said first arm, the first arm coming into engagement with the second arm during the end of the running down movement of the cocking member to turn the driving ring against the action of said spring into a position where said locking member falls behind said second arm and holds said driving ring against the action of said spring.

2. A diaphragm arrangement according to claim 1, wherein both the stop member and a diaphragm blade are pivotally mounted on a pin.

3. A diaphragm arrangement according to claim 1, wherein a diaphragm blade has mounted thereon the stop member.

4. A diaphragm arrangement according to claim 3, wherein the stop member is in the form of a pin.

5. A diaphragm arrangement according to claim 1, wherein stationary pins are provided in the housing so that the blades are pivotally connected, driving pins are provided on the diaphragm driving ring, and slots are also provided for engagement by the pins, every stationary pin is disposed on a straight line which is determined by the centre of the diaphragm opening and the assumed position of the corresponding driving pin after covering half of its maximum stroke.

6. For a camera having a shutter housing and a shutter arrangment comprising a cocking member and a release member therefor; the provision of a diaphragm arrangement according to claim 1, a pivoted release lever, spring means which urges the release lever in the direction to engage the cocking member to lock it releasably in the cocked position, a nose on the releasable lever, and a step on said cocking member engageable by said nose; whereby on the actuation of said release member by the operator, the release lever is pivoted bringing the nose into the path of said step, thereby causing the cocking member to run off until the step reaches the nose to interrupt the running down movement of the cocking member prior to the arm provided on the cocking member engaging the arm provided on the driving ring, on cessation of the pressure to said release lever, said spring pivoting the release lever causing the cocking member to continue the run down and moving the driving ring against action of its spring by means of the said arms.

7. An arrangement according to claim 6, wherein after cessation of pressure to the release lever a concentric face of the step comes into engagement with the nose of said release lever to prevent pivoting the release lever against the action of its spring.

References Cited in the file of this patent

UNITED STATES PATENTS

| | | |
|---|---|---|
| 798,595 | Brueck | Sept. 5, 1905 |
| 1,250,354 | Ricketts | Dec. 18, 1917 |
| 1,558,996 | Mroz | Oct. 27, 1925 |
| 2,094,799 | Lingg et al. | Oct. 5, 1937 |
| 2,340,573 | Aiken | Feb. 1, 1944 |
| 2,344,382 | McG. Aiken | Mar. 14, 1944 |
| 2,380,610 | Pignone | July 31, 1945 |
| 2,384,615 | Fuerst | Sept. 11, 1945 |
| 2,387,574 | Gehmlich | Oct. 23, 1945 |
| 2,448,876 | Fuerst | Sept. 7, 1948 |
| 2,716,930 | Marson | Sept. 6, 1955 |
| 2,805,610 | Haupt | Sept. 10, 1957 |
| 2,878,735 | Willcox | Mar. 24, 1959 |

FOREIGN PATENTS

| | | |
|---|---|---|
| 465,226 | Italy | Aug. 16, 1951 |
| 1,003,952 | France | Nov. 21, 1951 |
| 290,320 | Switzerland | Apr. 30, 1953 |
| 178,794 | Austria | June 10, 1954 |